United States Patent
De Ayguavives et al.

(10) Patent No.: US 11,573,431 B1
(45) Date of Patent: Feb. 7, 2023

(54) OPTICAL LENS COMPRISING AN ANTIREFLECTIVE COATING WITH MULTIANGULAR EFFICIENCY

(71) Applicant: ESSILOR INTERNATIONAL, Charenton-le-Pont (FR)

(72) Inventors: Francisco De Ayguavives, Les Lilas (FR); Hélène Maury, Paris (FR)

(73) Assignee: Essilor International, Charenton-le-Pont (FR)

( * ) Notice: Subject to any disclaimer, the term of this patent is extended or adjusted under 35 U.S.C. 154(b) by 764 days.

(21) Appl. No.: 16/337,628

(22) PCT Filed: Jun. 26, 2017

(86) PCT No.: PCT/EP2017/065740
§ 371 (c)(1),
(2) Date: Mar. 28, 2019

(87) PCT Pub. No.: WO2018/059752
PCT Pub. Date: Apr. 5, 2018

(30) Foreign Application Priority Data

Sep. 29, 2016 (EP) .................................... 16306256

(51) Int. Cl.
*G02B 1/11* (2015.01)
*G02C 7/02* (2006.01)
*G02B 1/115* (2015.01)

(52) U.S. Cl.
CPC ................. *G02C 7/02* (2013.01); *G02B 1/11* (2013.01); *G02B 1/115* (2013.01)

(58) Field of Classification Search
CPC .. G02C 7/02; G02B 1/115; G02B 1/11; G02B 1/10; G02B 5/03; G02B 5/02
See application file for complete search history.

(56) References Cited

U.S. PATENT DOCUMENTS

| | | | |
|---|---|---|---|
| 5,194,990 A | 3/1993 | Boulos et al. | |
| 6,565,982 B1 * | 5/2003 | Ouderkirk | G02B 5/305 |
| | | | 428/457 |

(Continued)

FOREIGN PATENT DOCUMENTS

| | | |
|---|---|---|
| CN | 102540282 A | 7/2012 |
| JP | H06-55101 U | 3/1994 |

(Continued)

OTHER PUBLICATIONS

Machine Translation of JPH09146039A (Year: 1997).*

(Continued)

*Primary Examiner* — Darryl J Collins
*Assistant Examiner* — Matthew Y Lee
(74) *Attorney, Agent, or Firm* — Norton Rose Fulbright US LLP (57) ABSTRACT

The present invention relates to an optical lens comprising a substrate with a front main face and with a rear main face, at least one of the main faces being coated with an antireflection coating, such that in the range [0°-50°] of angles of incidence θ, the mean light reflection factor Rv(θ) on said coated main face presents a minimum value $Rv_{min}$ for an angle of incidence $θ_{min}$, comprised in the range [20°-50°], and $Rv_{min}/Rv(15°)<0.95$, $Rv(15°)$ being the mean light reflection factor for an angle of incidence θ of 15° on said coated main face. The optical lens is also useful to inhibit reflection of light in the ultraviolet range.

18 Claims, 1 Drawing Sheet

(56) References Cited

U.S. PATENT DOCUMENTS

| | | | |
|---|---|---|---|
| 2012/0081792 A1 | 4/2012 | Neuffer | |
| 2013/0038834 A1* | 2/2013 | Cado | G02B 1/115 351/159.62 |
| 2017/0075040 A1 | 3/2017 | Bolshakov et al. | |

FOREIGN PATENT DOCUMENTS

| | | | | |
|---|---|---|---|---|
| JP | H06-511326 A | | 12/1994 | |
| JP | H09-146039 | | 6/1997 | |
| JP | H09146039 A | * | 6/1997 | G02B 1/11 |
| JP | 2002-509275 A | | 3/2002 | |
| JP | 2003-043202 A | | 2/2003 | |
| JP | 2004-145003 | | 5/2004 | |
| JP | 2008-525861 A | | 7/2008 | |
| JP | 2009-054902 | | 3/2009 | |
| JP | 2009-541810 A | | 11/2009 | |
| JP | H11-508380 A | | 3/2011 | |
| JP | 2011-141339 A | | 7/2011 | |
| JP | 2012-119046 | | 6/2012 | |
| JP | 2013-545145 A | | 12/2013 | |
| JP | 2015-508510 A | | 3/2015 | |
| JP | 2015-094885 A | | 5/2015 | |
| JP | 2016-523385 A | | 8/2016 | |
| JP | 2017-519232 A | | 7/2017 | |
| WO | WO 1997/001778 | | 1/1997 | |
| WO | WO 1999/36804 | | 7/1999 | |
| WO | WO 2006/071803 | | 7/2006 | |
| WO | WO 2008/001011 | | 1/2008 | |
| WO | WO 2012/076714 | | 6/2012 | |
| WO | WO 2013/098531 | | 7/2013 | |
| WO | WO 2015/000534 | | 1/2015 | |
| WO | WO 2015/170133 | | 11/2015 | |

OTHER PUBLICATIONS

International Search Report and Written Opinion issued in International Patent Application No. PCT/EP2017/065740, dated Jul. 24, 2017.

Communication pursuant to Article 94(3) EPC issued by the European Patent Office in corresponding U.S. Appl. No. 16/306,256, dated Mar. 19, 2021.

Notice of Reasons for Refusal from the Japanese Patent Office issued in corresponding Application No. 2019-515594, dated Jun. 1, 2021.

* cited by examiner

OPTICAL LENS COMPRISING AN ANTIREFLECTIVE COATING WITH MULTIANGULAR EFFICIENCY

CROSS-REFERENCE TO RELATED APPLICATIONS

This application is a national phase application under 35 U.S.C. § 371 of International Application No. PCT/EP2017/065740 filed 26 Jun. 2017, which claims priority to European Patent Application No. 16306256.5 filed 29 Sep. 2016. The entire contents of each of the above-referenced disclosures is specifically incorporated by reference herein without disclaimer.

FIELD OF THE DISCLOSURE

The present invention relates to an optical lens comprising on at least one of its main faces an antireflective coating that strongly reduces reflection of visible light over a wide range of angles of incidence. The optical lens may be an ophthalmic lens, especially a spectacle lens.

DESCRIPTION OF RELATED ART

An antireflection coating usually consists of a multilayer stack comprising interferential thin layers, generally an alternation of layers based on dielectric or sol-gel materials of high and low refractive index. When deposited on a transparent substrate of an optical article, the function of such a coating is to reduce the light reflection at the article-air interface within a relatively large portion of the visible light spectrum, and therefore to increase light transmission. A substrate thus coated will have its transmitted light/reflected light ratio increased, thereby improving the visibility of objects placed in front of it. When it is sought to achieve a maximum antireflection effect in an optical article, it is preferable to provide both faces (front and rear faces) of the substrate with this type of coating. Antireflective coatings are usually used in the field of ophthalmic optics. However, most of antireflection coatings developed hitherto have been designed and optimized to reduce light reflection on a lens surface at an incidence close to normal (angle of incidence θ of 0°-15° in the visible region, typically within the spectrum range of from 380 to 780 nm. In general, the mean light reflection factor in the visible region $R_v$ on the front and/or rear faces of an optical lens is lower than 2.5% per face at 15°.

However, the mean light reflection factor $R_v$ depends on the angle of incidence θ, and the commercial antireflection coatings have not been designed to provide low $R_v$ values for angles of incidence higher than 15°. Most of them have a $R_v$ that increases beyond 15° and that can be twice higher at 40° for example.

It would be particularly interesting to have an antireflection coating having low $R_v$ values on a broad angular range, typically [0°-45°] and preferably [0°-50°]. In the case of an ophthalmic lens, both the wearer and observer would benefit from this improvement.

From the observer's point of view, the benefits are mainly esthetic. The front and side mirror effect would be decreased, leading to the ability to have a better vision of the eyes of the wearer whether the observer is located in front of the wearer or on a lateral position. The observer would also be less troubled by reflections when moving from one side of the wearer to the other.

From the wearer's point of view, decreasing reflection of light rays comprised in an incident angle of [30°-45°] is crucial, as light having such angles of incidence generates reflection from the backside of the lens and discomfort.

SUMMARY OF THE INVENTION

In view of the foregoing, there is a need for optical lenses having novel antireflective coatings with a high efficiency on a wide range of angles of incidence in the visible range, taking especially account of high angles of incidence, without affecting the functional properties of other coatings, while having at the same time improved esthetic appearance, in particular an antireflective coating displaying a homogeneous color and color intensity in reflection on an extended angle of incidence range. It is also desirable that the optical lens be designed to reduce reflection on the back surface of the lens within the UVA band of from 315 to 400 nm and/or the UVB band of from 280 to 315 nm. These UVA and UVB bands are indeed particularly harmful to the retina.

To address the needs of the present invention and to remedy to the mentioned drawbacks of the prior art, the applicant provides an optical lens comprising a substrate with a front main face and with a rear main face, at least one of the main faces being coated with an antireflection coating such that:
in the range [0°-50°] of angles of incidence θ, the mean light reflection factor $R_v(\theta)$ on said coated main face presents a minimum value $R_{vmin}$ for an angle of incidence $\theta_{min}$ comprised in the range [20°-50°], and
$R_{vmin})R_v(15°)<0.95$, $R_v(15°)$ being the mean light reflection factor for an angle of incidence θ of 15° on said coated main face.

BRIEF DESCRIPTION OF THE DRAWINGS

The foregoing and other objects, features and advantages of the present invention will become readily apparent to those skilled in the art from a reading of the detailed description hereafter when considered in conjunction with the accompanying drawings.

DETAILED DESCRIPTION OF THE INVENTION

As used herein, when an article comprises one or more layer(s) or coating(s) on the surface thereof, "depositing a layer or a coating onto the article" means that a layer or a coating is deposited onto the uncovered (exposed) surface of the article external coating, that is to say the coating that is the most distant from the substrate.

As used herein, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coating(s) may be interleaved between the substrate/coating and the relevant coating (however, it does preferably contact said substrate/coating), and (iii) does not necessarily completely cover the substrate/coating. When "a coating 1 is said to be located under a coating 2", it should be understood that coating 2 is more distant from the substrate than coating 1.

The term "coating" is understood to mean any layer, layer stack or film which may be in contact with the substrate and/or with another coating, for example a sol-gel coating or a coating made of an organic resin. A coating may be deposited or formed through various methods, including wet processing, gaseous processing, and film transfer.

Herein, the term "lens" means an organic or inorganic glass lens or lens blank, preferably transparent, in particular an ophthalmic lens or lens blank, comprising a lens substrate which may be coated with one or more coatings of various natures. The lens can be chosen from afocal, unifocal, bifocal, trifocal and progressive lenses.

The term "ophthalmic lens" is used to mean a lens adapted to a spectacle frame to protect the eye and/or correct the sight. Although ophthalmic optics is a preferred field of the invention, it will be understood that this invention can be applied to optical lenses of other types where preventing light reflection may be beneficial, such as, for example, lenses for optical instruments, in photography or astronomy, optical sighting lenses, ocular visors, optics of lighting systems, etc.

In the present description, unless otherwise specified, an optical element/material is understood to be transparent when the observation of an image through said optical article is perceived with no significant loss of contrast, that is, when the formation of an image through said optical article is obtained without adversely affecting the quality of the image.

The optical lens is coated on its front main surface, rear main side, or both sides with at least one functional coating. As used herein, the rear face of the substrate is intended to mean the face which, when using the article, is the nearest from the wearer's eye. It is generally a concave face. On the contrary, the front face of the substrate is the face which, when using the article, is the most distant from the wearer's eye. It is generally a convex face. The optical lens can also be a plano lens.

A substrate, in the sense of the present invention, should be understood to mean an uncoated substrate, and generally has two main faces. The substrate may in particular be an optically transparent material having the shape of an optical article, for example an ophthalmic lens destined to be mounted in a spectacle frame. In this context, the term "substrate" is understood to mean the base constituent material of the optical lens and more particularly of the ophthalmic lens. This material acts as support for a stack of one or more coatings or layers.

The substrate of the article of the invention may be a mineral or an organic substrate, for instance an organic substrate made from a thermoplastic or thermosetting plastic, generally chosen from transparent materials of ophthalmic grade used in the ophthalmic industry.

To be mentioned as especially preferred classes of substrate materials are polycarbonates, polyamides, polyimides, polysulf ones, copolymers of polyethylene therephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company, the corresponding marketed lenses being referred to as ORMA® lenses from ESSILOR), poly- carbonates such as those derived from bisphenol-A, (meth) acrylic or thio(meth)acrylic polymers and copolymers such as poly methyl methacrylate (PMMA), urethane and thiourethane polymers and copolymers, epoxy polymers and copolymers, episulfide polymers and copolymers.

Prior to depositing the antireflective coating onto the optionally coated substrate, for example with an abrasion-resistant layer and/or a scratch-resistant coating or with a primer coating, the surface of said optionally coated substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

The antireflective coating according to the invention is especially designed to minimize the reflection of visible radiations having an angle of incidence on the lens ranging from 0° to 45°, and preferably from 0° to 50°.

According to the invention, the angle of incidence is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range of angles of incidence is from 0° to 75°. From the observer's point of view, the angle of incidence is also the angle of observation.

An antireflective coating is defined as a coating, deposited onto the surface of an optical article, which improves the antireflective properties of the final optical article. It makes it possible to reduce the light reflection at the article-air interface over a relatively large portion of the visible spectrum. By definition, an antireflection coating imparts to a main face of the substrate a mean light reflection factor $R_v$ lower than or equal to 2.5% for an angle of incidence of 15°.

In the range [0°-50°] of angles of incidence θ, the mean light reflection factor $R_v(\theta)$ on the main face of the substrate coated with the antireflection coating presents a minimum value $R_{vmin}$ for an angle of incidence $\theta_{min}$ comprised in the range [20°-50°]. $\theta_{min}$ is preferably comprised in the range [20°-35°].

Further, $R_{vmin}/R_v(15°)<0.95$, $R_v(15°)$ being the mean light reflection factor for an angle of incidence θ of 15° on said coated main face. Preferably, $R_{vmin}/R_v(15°)<0.9$, more preferably <0.8. The fact that $Rv_{min}$ is lower than $Rv(15°)$ by at least 5%, preferably at least 10%, more preferably at least 20% and that $R_v(\theta)$ reaches a minimum for an angle of incidence higher than 15° (as shown on FIGS. 1 and 2) is quite unusual, as antireflection coatings developed hitherto exhibit a variation of $R_v$ as a function of the angle of incidence θ that is monotonically increasing.

Actually, reflections on lenses are a cause of discomfort and corrupted vision. To measure correctly this effect, light arriving on wearer's lens has to be integrated in all incidence angles. It means that light arriving at a large incident angle contributes to the same extent to $R_v(\theta)$ as light arriving with a low incident angle. The specific variation of $R_v(\theta)$ in the invention is the reason why the present antireflection coating is very efficient on a wide range of angles of incidence.

In a preferred embodiment, the antireflection coating is such that $R_v(35°)<R_v(\theta)$ for $\theta=0°$, 10° or 15°, and/or $R_v(30°)<R_v(\theta)$ for $\theta=0°$, 10° or 15°. The evolution of $R_v$ as a function of the angle of incidence $\theta$ is preferably monotonically decreasing between 15° and $\theta_{min}$, more preferably between 0° and $\theta_{min}$.

In the present description, the "mean light reflection factor" noted $R_v(\theta)$ (which is also called "luminous reflection factor"), is such as defined in the ISO standard 13666: 1998, that is to say this is the weighted spectral reflection average over the whole visible spectrum between 380 and 780 nm. $R_v(\theta)$ is measured according to the ISO 8980-4 standard but is not limited to the range of angles of incidence indicated in this standard (namely an angle of incidence lower than 17°, typically of 15°). $R_v(\theta)$ can be measured at any angle of incidence ranging from 0° to 90°, typically from 0° to 50°.

In one embodiment of the invention, the antireflective coating is such that $R_v(15°)$ is lower than or equal to 1.5%, preferably lower than or equal to 1%, more preferably lower than or equal to 0.75% on the main face coated with said antireflection coating.

In another embodiment of the invention, the antireflective coating is such that $R_v(35°)$ is lower than or equal to 1.5%, preferably lower than or equal to 1%, more preferably lower than or equal to 0.6% on the main face coated with said antireflection coating.

In some aspects of the invention, the antireflective coating is such that $R_v(\theta)$ is lower than or equal to 1.5%, preferably lower than or equal to 1% for each angle of incidence $\theta$ ranging from 0° to 45° on the main face coated with said antireflection coating. Still preferably, the antireflective coating is such that $R_v(\theta)$ is lower than or equal to 0.6% for each angle of incidence $\theta$ ranging from 0° to 40° on the main face coated with said antireflection coating.

The global efficiency of an antireflection treatment on an optical surface for angles of incidence ranging from 0° to $\theta_{max}$ can be quantified by the following parameter:

$$\alpha = K \int_0^{\theta max} Rv(\theta)\sin\theta d\theta$$

The lowest the coefficient $\alpha$, the lowest the global reflection phenomena.

For comparison of performances of antireflective coatings over various domains of incident angles, coefficient $\alpha$ is normalized with numeric constant K so as to have a coefficient $\alpha$ equal to 1% for a model $R_v(\theta)$ function being constant and equal to 1%. K depends only on $\theta$max and is defined by the following equation:

$$\frac{1}{K} = \int_0^{\theta max} \sin\theta d\theta$$

By this way, the performance of a lens over the range [0°-40°] can be compared to another lens over the range [0°-50°].

An approximate value of coefficient $\alpha$ may be computed by several simplifications. As $R_v(\theta)$ presents several domains for $\theta$ in which $R_v$ is almost constant, one can define coefficient $\alpha$ by the following equation:

$$\frac{\alpha}{K} \approx \widehat{Rv1} \int_0^{\theta 1} \sin\theta d\theta + \widehat{Rv2} \int_{\theta 1}^{\theta max} \sin\theta d\theta$$

Where $\widehat{Rv1}$ is the average value of Rv over the range 0° to $\theta 1$ and $\widehat{Rv2}$ is the average value of Rv over the range $\theta 1$ to $\theta$max.

$\theta 1$ is selected so as to separate a domain of low incident angles and a domain of high incident angles including $\theta$min. In particular, $\theta 1$ can be selected in the range of 15° to 40°.

With this definition, the two integrals of approximate coefficient $\alpha$ are purely geometric and can be computed exactly, and are renormalized with numeric constant K so as to have a coefficient $\alpha$ equal to 1% for a model $R_v(\theta)$ function being constant and equal to 1%.

In particular, $\theta$max is higher than 35°, preferably higher than 40°. In some embodiments, $\theta$max is higher than 45°, even better higher than 50°. The largest $\theta$max, the more incident light is integrated in the coefficient $\alpha$.

The global efficiency of an antireflection treatment on a substrate having two opposed surfaces, such as an optical lens, for angles of incidence ranging from 0° to $\theta$max can be quantified by the following parameter:

$$\alpha 2 = K2 \left( \int_0^{\theta max} Rv^{front}(\theta)\sin\theta d\theta + \int_0^{\theta max} Rv^{rear}(\theta)\sin\theta d\theta \right)$$

In which $Rv^{front}(\theta)$ represents the mean light reflection factor for the front main face of the substrate and $Rv^{rear}(\theta)$ represents the mean light reflection factor for the rear main face of the substrate for an angle of incidence $\theta$.

Approximate values for coefficient $\alpha 2$ may be computed in a similar manner as for coefficient $\alpha$. In particular, numeric constant K2 is computed so as to have a coefficient $\alpha 2$ equal to 1% for model functions $Rv^{front}(\theta)$ and $Rv^{rear}(\theta)$ being constant and equal to 1%.

In a specific embodiment, $\theta$max is set to 45°, $\theta 1$ is set to 25°, $\widehat{Rv1}$ is set to Rv(15°) for front and rear faces, $\widehat{Rv2}$ is set to Rv(35°) for front and rear faces and the resulting formula for coefficient $\alpha 2$ is the following, the computing of which is detailed in the experimental part:

$\alpha 2 = 0.159 \cdot (R_v^{front}(15°) + R_v^{rear}(15°)) + 0.341 \cdot (R_v^{front}(35°) + R_v^{rear}(35°))$ This parameter is particularly meaningful as it takes into account both low and high angles of incidence.

Low $\alpha$ or $\alpha 2$ values indicate a high multiangular efficiency of an antireflection treatment. The parameter $\alpha 2$ of the present optical lens is preferably lower than or equal to 0.7, more preferably lower than or equal to 0.6, even better lower than or equal to 0.55. Such a high level of multiangular efficiency of the antireflection property is attained by optical lenses having on both main faces an antireflection coating according to the invention.

The parameter $\alpha$ of an antireflection coating according to the invention is preferably lower than or equal to any one of the following values: 0.85, 0.75, 0.70, 0.60, 0.50, and 0.40. An antireflection coating on the front face of the lens preferably has an a parameter lower than or equal to 0.85, more preferably lower than or equal to 0.75, even better lower than or equal to 0.70, 0.60, or 0.50. An antireflection coating on the front face of the lens preferably has an a parameter lower than or equal to 0.70, more preferably lower than or equal to 0.60, even better lower than or equal to 0.50, and much better lower than or equal to 0.40.

In some aspects of the invention, the antireflective coating is such that the $R_m$ factor is lower than or equal to 2.5%, 2%, 1.5%, 1%, 0.8% or 0.6% on the main face coated with said antireflection coating.

In the present application, the "mean reflection factor," noted $R_m$, is such as defined in the ISO 13666:1998 Standard, i.e., this is the (non-weighted) spectral reflection average over the whole visible spectrum between 400 and 700 nm. $R_m$ is measured in accordance with the ISO 8980-4 standard, i.e., for an angle of incidence lower than 17° (15° in the present application).

The optical lens according to the invention has a relative light transmission factor in the visible spectrum Tv preferably higher than or equal to any one of the following values: 87%, 88%, 89%, 90%, 92%, 95%. Said Tv factor preferably ranges from 87% to 98.5%, more preferably from 87% to 97%, even better from 87% to 96%. In another embodiment, Tv ranges from 89% to 98%, preferably from 90% to 97%.

The Tv factor, also called "luminous transmission" of the system, is such as defined in the standard NF EN 1836 and relates to an average in the 380-780 nm wavelength range that is weighted according to the sensitivity of the eye at each wavelength of the range and measured under D65 illumination conditions (daylight).

The colorimetric coefficients of the optical lens of the invention in the international colorimetric CIE L*a*b* are calculated between 380 and 780 nm, taking the standard illuminant D65 and the observer into account (angle 10°—standard observer).

According to embodiments of the present invention, the antireflective coating deposited onto at least one of the main faces of the substrate is such that:
- the chroma C* is lower than or equal 22, preferably 20, more preferably 15, for an angle of incidence of 15°, and/or
- the residual color displayed by said antireflection coating has a hue angle (h) ranging from 240° to 300°, preferably from 250° to 290°, more preferably from 260° to 280°, for an angle of incidence of 15°, thus resulting in a coating having a blue to violet reflection. It is preferred that the color of the residual reflected light of the antireflection stack be blue for an angle of incidence of 15°, with a minimum of reflection in the green-yellow region. Actually, if the minimum of reflection is in the green-yellow region above the maximum eye sensitivity in photopic conditions (around 550 nm) for an incidence angle of 15°, the minimum of reflection for an incidence angle of 35° will be shifted towards the blue end of the visible spectrum (shorter wavelengths), in a region below the maximum eye sensitivity in photopic conditions. Consequently, a minimum of reflection will be perceived for an incident angle between 15° and 35°, where the minimum of reflection will be located exactly at the maximum eye sensitivity in photopic conditions.

Preferably, the antireflective coating of the present invention shows smooth perceived residual reflected color variation according to the angle of incidence θ, which means that there is no significant color gradient of different hues nor color gradient of different color intensities across the lens surface, whatever the angle of incidence at which the coated substrate is observed, leading to an improved esthetic appearance.

The antireflection coating is generally a monolayered or a multilayered stack composed of dielectric and/or sol-gel materials and/or organic/inorganic layers such as disclosed in WO 2013/098531. It is preferably a multilayered coating, comprising a stack of at least one layer with a high refractive index (HI) and of at least one layer with a low refractive index (LI). More preferably, it comprises at least two layers with a low refractive index and at least two layers with a high refractive index. The layer total number in the antireflective coating is preferably higher than or equal to 3, more preferably higher than or equal to 4, and preferably lower than or equal to 8, more preferably lower than or equal to 7, even more preferably lower than or equal to 6 layers.

In the present application, a layer of the antireflective coating is said to be a layer with a high refractive index when its refractive index is higher than 1.55, preferably higher than or equal to 1.6, more preferably higher than or equal to 1.8 and even more preferably higher than or equal to 1.9. Said HI layer preferably has a refractive index lower than 3. A layer of an antireflective coating is said to be a low refractive index layer when its refractive index is lower than or equal to 1.55, preferably lower than or equal to 1.50, more preferably lower than or equal to 1.48. Said LI layer preferably has a refractive index higher than 1.1. Unless otherwise specified, the refractive indexes referred to in the present invention are expressed at 25° C. at a wavelength of 550 nm.

As used herein, a layer of the antireflective coating is defined as having a thickness higher than or equal to 1 nm. Thus, any layer having a thickness lower than 1 nm will not be considered when counting the number of layers in the antireflective coating. A sub-layer (when present) either is not considered when counting the number of layers of the antireflective coating.

HI layers and BI layers do not need to alternate with each other in the stack, although they also may, according to one embodiment of the invention. Two HI layers (or more) may be deposited onto each other, as well as two LI layers (or more) may be deposited onto each other.

The high refractive index layers are well known in the art. They generally comprise one or more metal oxides such as, without limitation, zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), $La_2O_3$, niobium oxide ($Nb_2O_5$), $Y_2O_3$, silicon nitride and silicon oxynitride. Optionally, the HI layers may further contain silica or other materials with a low refractive index, provided they have a refractive index higher than 1.55 as indicated hereabove. The preferred materials include $ZrO_2$, $Al_2O_3$, $Ta_2O_5$, $Nb_2O_5$ and mixtures thereof.

In a preferred embodiment, the antireflection coating according to the invention doesn't contain titanium dioxide ($TiO_2$).

The LI layers are also well known and may comprise, without limitation, silicon oxides such as $SiO_2$, $MgF_2$, or a mixture of silica and alumina, especially silica doped with alumina, the latter contributing to increase the antireflective coating thermal resistance. The LI layer is preferably a layer comprising at least 80% by weight of silica, more preferably at least 90% by weight of silica, relative to the layer total weight, and even more preferably consists in a silica layer.

Optionally, the LI layers may further contain materials with a high refractive index, provided the refractive index of the resulting layer is lower than or equal to 1.55.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48–1.50 at 550 nm), or L5° marketed by the Merck KGaA company (refractive index n=1.48 at 500 nm).

LI layers may be prepared in the form of nanoporous layers, in which air included in the material lowers the average refractive index of the layer. In preferred embodiments of the invention, LI layers are not nanoporous layers.

The antireflective coating outer layer is generally a low refractive index layer, in particular a silica-based layer, comprising preferably at least 80% by weight of silica, more preferably at least 90% by weight of silica (for example a silica layer doped with alumina), relative to the layer total weight, and even more preferably consists of a silica layer.

The antireflection coating preferably comprises, under its outer layer, a bilayer having a thickness of 60 nm or less, preferably 30 nm or less, composed of a low refractive index layer and a high refractive index layer, said high refractive index layer being in direct contact with the outer layer of the antireflection coating. The high refractive index layer of said bilayer is preferably an electrically conductive layer as described hereunder. The low refractive index layer of said bilayer is such as described above and preferably has a physical thickness lower than or equal to 35 nm, preferably lower than or equal to 30 nm, more preferably lower than or equal to 25 nm.

This bilayer enables to improve the optical robustness and the colorimetric stability on a wide range of angles of incidence of the stack. Indeed, antireflection coatings having such bilayer present a weak variation of the residual reflected color according to the angle of incidence (from 0° to 45°) and therefore good esthetic performances.

Generally, the HI layers have a physical thickness ranging from 10 to 120 nm (antistatic HI layers generally have a lower thickness), and the LI layers have a physical thickness ranging from 10 to 100 nm.

Generally, the antireflective coating total thickness is lower than 1 micrometer, preferably lower than or equal to 800 nm, more preferably lower than or equal to 500 nm and even more preferably lower than or equal to 250 nm. The antireflective coating total thickness is generally higher than 100 nm, preferably higher than 150 nm.

In one embodiment of the present invention, the antireflective coating is deposited onto a sub-layer. It should be noted that such antireflective coating sub-layer does not belong to the antireflective coating.

As used herein, an antireflective coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating. The sub-layer has preferably a refractive index lower than or equal to 1.55.

Because of its relatively high thickness, the sub-layer does not generally take part to the antireflective optical activity, especially when it has a refractive index close to that of the underlying coating (which is generally the anti-abrasion and anti-scratch coating) or to that of the substrate, if the sub-layer is directly deposited onto the substrate.

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor τv. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this $SiO_2$-based layer is a silica layer doped with alumina, in amounts such as defined hereabove, preferably consists of a silica layer doped with alumina.

In a particular embodiment, the sub-layer consists of a $SiO_2$ layer.

A sub-layer of the monolayer type will be preferably used. However, the sub-layer may be laminated (multilayered), especially when the sub-layer and the underlying coating (or the substrate, if the sub-layer is deposited directly onto the substrate) have a substantially different refractive index. This applies especially when the underlying coating, which is generally an anti-abrasion and/or anti-scratch coating, or the substrate, have a high refractive index, i.a. a refractive index higher than or equal to 1.55, preferably higher than or equal to 1.57.

In this case, the sub-layer may comprise, in addition to a generally 90-300 nm-thick layer, called the main layer, preferably at most three additional layers, more preferably at most two additional layers, interleaved between the optionally coated substrate and such generally 90-300 nm-thick layer, which is generally a silica-based layer. These additional layers are preferably thin layers, which function is to limit the reflections at the sub-layer/underlying coating interface or sub-layer/substrate interface, as appropriate.

A multilayered sub-layer preferably comprises, in addition to the main layer, a layer with a high refractive index and with a thickness lower than or equal to 80 nm, more preferably lower than or equal to 50 nm and most preferably lower than or equal to 30 nm. Such layer with a high refractive index is directly contacting the substrate with a high refractive index or the underlying coating with a high refractive index, as appropriate. Of course, this embodiment may be used even if the substrate (or the underlying coating) has a refractive index lower than 1.55.

As an alternative, the sub-layer comprises, in addition to the main layer and to the previously mentioned layer with a high refractive index, a layer made of a $SiO_2$-based material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 40 nm, onto which is deposited said layer with a high refractive index. Typically, in this instance, the sub-layer comprises, deposited in this order onto the optionally coated substrate, a 30-40 nm-thick $SiO_2$ layer, a 4-10 nm-thick $ZrO_2$ or $Ta_2O_5$ layer and thereafter the sub-layer main layer.

In some aspects of the invention, the antireflective coating includes at least one electrically conductive layer. This layer serves as an antistatic component. Without being bound by theory, the at least one electrically conductive layer prevents the antireflective coating stack from developing and/or retaining a substantial static electric charge.

The ability for a glass to evacuate a static charge obtained after rubbing with a piece of cloth or using any other procedure to generate a static charge (charge applied by corona) may be quantified by measuring the time it takes for said charge to dissipate. Thus, antistatic glasses have a discharge time of about a few hundred milliseconds (ms), preferably 500 ms or less, whereas it is of about several tens of seconds for a static glass. In the present application, discharge times are measured according to the method disclosed in FR 2943798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided that the anti-reflective properties thereof are not affected. It is preferably located between two layers of the antireflective coating, and/or is adjacent to a layer with a high refractive index of such antireflective coating. Preferably, the electrically conductive layer is located immediately under a layer with a low refractive index of the antireflective coating, most preferably is located immediately under the outer layer of the antireflective coating.

The electrically conductive layer should be thin enough not to alter the transparency of the antireflective coating. In a particular embodiment, the at least one electrically conductive layer has a refractive index greater than 1.55. It is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer, or a tin oxide layer.

Generally, the electrically conductive layer contributes, within the stack, but in a limited manner, because of its low thickness, to obtaining antireflective properties and represents a layer with a high refractive index in the antireflective coating. This is the case for those layers made from an electrically conductive and highly transparent material such as ITO layers or tin oxide layers.

The optical lens of the invention can be configured to reduce reflection in the UVA- and UVB-radiation ranges (respectively 315-380 nm and 280-315 nm), in addition to reducing reflection in the visible region, so as to allow the best health protection against UV light.

It is advisable for a spectacle wearer to wear before each of both eyes an ophthalmic lens that strongly reduces reflection on the rear face in the UVA- and UVB-radiation ranges, which are particularly harmful to the retina. Such lenses may also provide increased visual performance due to increased contrast sensitivity.

Reflecting UV light is not really problematic on the front face of the lens, since the major part of the UV radiation which comes from the front of the wearer and might attain the wearer's eye (normal incidence, 0 to 15°) generally gets absorbed by the ophthalmic lens substrate. On the other hand, the UV radiation resulting from light sources located behind the wearer may reflect on the lens rear face and reach the wearer's eye if the lens is not provided with an antireflective coating which is efficient in the ultraviolet region, thus potentially affecting the wearer's health. It is admitted that the light rays that may reflect onto the lens rear face and reach the wearer's eye have a narrow incidence angle range, ranging from 30 to 45° (oblique incidence).

In this regard, the antireflection coating on the rear main face of the optical lens, and optionally the antireflection coating on its front main face, which exhibit very good antireflective performances in the visible region, are preferably at the same time capable of significantly reducing the UV radiation reflection, especially ultraviolet A- and ultraviolet B-rays, as compared to a bare substrate or to a substrate comprising a traditional antireflective coating that is only efficient in the visible region.

The mean reflection factor $R_{UV}$ on the rear main face between 280 nm and 380 nm, weighted by the function $W(\lambda)$ defined in the ISO 13666:1998 standard, is preferably lower than 5%, preferably lower than 4.5%, more preferably lower than or equal to 4%, even better lower than or equal to 3% for an angle of incidence of 35°. In another embodiment, the mean reflection factor $R_{UV}$ on the rear main face between 280 nm and 380 nm, weighted by the function $W(\lambda)$ defined in the ISO 13666:1998 standard, is preferably lower than 5 for both an angle of incidence of 30° and for an angle of incidence of 45°. Said mean reflection factor $R_{UV}$ is defined through the following relation:

$$R_{UV} = \frac{\int_{280}^{380} W(\lambda) \cdot R(\lambda) \cdot d\lambda}{\int_{280}^{380} W(\lambda) \cdot d\lambda}$$

wherein $R(\lambda)$ represents the lens spectral reflection factor at a given wavelength, and $W(\lambda)$ represents a weighting function equal to the product of the solar spectrum irradiance $Es(\lambda)$ and the efficiency relative spectral function $S(\lambda)$. In certain embodiments, this factor may be measured at an angle of incidence that ranges from 30° to 45° on the rear face.

The spectral function $W(\lambda)$, enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy $Es(\lambda)$ into account, which does globally emit less UVB-rays as compared to UVA-rays, and the spectral efficiency $S(\lambda)$, UVB-rays being more harmful than UVA-rays. The values for those three functions in the ultraviolet region are given in the table disclosed in ISO 13666:1998 Standard (which is reproduced at page 6 of the publication WO 2012/076714).

The above anti-UV performances are provided by the antireflection coating while maintaining low $R_v$ factors for a wide range of angles of incidence.

In some embodiments, Ruv is lower than 5% and $R_{vmin}/R_v(15°)<0.95$. This performance is especially suitable for the rear face of the optical article.

In other embodiments, Ruv may be higher than 5% and $R_{vmin}/R_v(15°)<0.95$, preferably <0.9, more preferably <0.8. This performance is especially suitable for the front face of the optical article for which UV reflection does not need to be minimized.

The front and/or rear main faces of the optical article can be coated with identical or different antireflection coatings according to the invention, i.e., antireflection coatings having the above described $R_{vmin}$ and $R_{vmin}/R_v(15°)$ properties.

Preferably, both main faces of the optical lens are coated with identical or different antireflection coatings according to the invention.

In one embodiment of the invention, the front face the optical article is coated with an antireflection coating according to the invention having a $R_{vmin}/R_v(15°)<0.9$, preferably <0.8.

When the optical lens comprises antireflection coatings on each of its main faces, the antireflection coating of the front face of the optical lens is not necessarily identical to that of the rear face. In this case, it is possible for the front face of the optical lens to be coated with an antireflective coating that is more efficient in the visible region than that of the substrate's rear face. Thus, in a preferred embodiment, the front face of the optical lens is coated with an antireflective coating so that the mean reflection factor in the visible region $R_m$ on this front face is lower than 0.8%, more preferably lower than 0.5%. Preferably, the mean light reflection factor $R_v(\theta)$ on this front face is lower than 0.8%, more preferably lower than 0.5%, for an angle of incidence of 15°. Still preferably, the mean reflection factor $R_{UV}$ between 280 nm and 380 nm, weighted by the function $W(\lambda)$ as defined according to the ISO 13666:1998 standard, is higher on the front face (generally >5% or 10% for an angle of incidence of 45°) than on the rear face of the optical lens.

According to a preferred embodiment of the invention, the antireflective coating comprises, in the direction moving away from the substrate:

a monolayer sub-layer having a thickness of from 100 to 300 nm, preferably 120 to 180 nm, a high refractive index layer having a thickness of from 5 to 25 nm, preferably 8 to 15 nm, a low refractive index layer having a thickness of from 20 to 50 nm, preferably 25 to 45 nm, a high refractive index layer which has a thickness of from 75 to 150 nm, preferably 80 to 120 nm, a low refractive index layer having a thickness of from 10 to 30 nm, preferably 15 to 28 nm, a high refractive index layer having a thickness of from 3 to 20 nm, preferably 4 to 15 nm, which is preferably an electrically conductive layer, an outer low refractive index layer having a thickness of from 40 to 90 nm, preferably 45 to 75 nm.

When a multilayered sub-layer is deposited, the above monolayer sub-layer is preferably replaced with the following trilayer sub-layer comprising:

i) a low refractive index layer having a thickness of from 15 to 80 nm, preferably 20 to 50 nm, ii) a high refractive index layer having a thickness of from 3 to 40 nm, preferably 4 to 25 nm, iii) a low refractive index layer having a thickness of from 100 to 300 nm, preferably 105 to 160 nm.

The present invention provides hence an antireflective coating with an improved conception, comprising a stack made of thin layers, the thicknesses and materials of which have been selected so as to obtain very good antireflective performances both in the visible region and optionally in the ultraviolet region, over a wide range of incident angles, while having esthetic appearance and robustness properties.

In some applications, it is preferred that the substrate's main surface be coated with one or more additional functional coating(s) to improve the optical and/or mechanical properties. These functional coatings classically used in optics may be, without limitation, an impact-resistant and/or adhesion primer, an abrasion-resistant and/or scratch-resistant coating, a polarized coating, a photochromic coating, a tinted coating, or a stack made of two or more such coatings, especially an impact-resistant primer coating coated with an abrasion and/or scratch-resistant coating.

The antireflective coating of the invention is preferably deposited onto an anti-abrasion and/or anti-scratch coating. Abrasion- and/or scratch-resistant coatings (hard coats) are preferably hard coatings based on poly(meth)acrylates or silanes. Recommended hard abrasion- and/or scratch-resistant coatings in the present invention include coatings obtained from silane hydrolyzate-based compositions (sol-gel process), in particular epoxysilane hydrolyzate-based compositions such as those described in the US patent application US 2003/0165698 and in U.S. Pat. No. 4,211,823 and EP 614957.

The thickness of the anti-abrasion and/or scratch-resistant coating (after curing) does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product. This coating is preferably made of polyurethane latexes or acrylic latexes, and preferably has a thickness, after curing, of from 0.2 to 2.5 μm, more preferably of from 0.5 to 1.5 μm.

Primer coatings and abrasion-resistant and/or scratch-resistant coatings may be selected from those described in the application WO 2007/088312.

The optical lens according to the invention may also comprise coatings formed on an antireflective coating and capable of modifying the surface properties thereof, such as a hydrophobic and/or oleophobic coating (antifouling top coat). These coatings are preferably deposited onto the outer layer of the antireflective coating. As a rule, their thickness is lower than or equal to 10 nm, does preferably range from 1 to 10 nm, more preferably from 1 to 5 nm. They are generally coatings of the fluorosilane or fluorosilazane type. They may be obtained by depositing a fluorosilane or fluorosilazane precursor, comprising preferably at least two hydrolysable groups per molecule. Fluorosilane precursors preferably comprise fluoropolyether moieties and more preferably perfluoropolyether moieties.

Optool DSX™, KY130™, OF210™, Aulon™ are examples of commercial hydrophobic and/or oleophobic coatings. More detailed information on these coatings is disclosed in WO 2012076714.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

The various layers of the antireflective coating and the optional sub-layer are preferably deposited by vapor phase deposition, under vacuum, according to any of the following methods: i) by evaporation, optionally ion-beam assisted; ii) by ion-beam spraying; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating and of the optional sub-layer is conducted by evaporation under vacuum.

Other coatings such as primers, hard coats and antifouling top coats may be deposited using methods known in the art, including spin-coating, dip-coating, spray-coating, evaporation, sputtering, chemical vapor deposition and lamination.

The following examples illustrate the present invention in a more detailed, but non-limiting manner. Unless stated otherwise, all thicknesses disclosed in the present application relate to physical thicknesses.

EXAMPLES

1. Materials and Methods

The optical articles used in the examples comprise a lens substrate having a 65 mm diameter, a refractive index of around 1.5 or around 1.6, and a power of −2.00 diopters, coated with a hard coat layer of refractive index about 1.5 (such as those described in EP 0614957, noted HC1.5) or about 1.6 (noted HC1.6).

The sub-layers and layers of the antireflective coating were deposited without heating the substrates by evaporation under vacuum (evaporation source: electron gun). In example 13, the $SiO_2/Al_2O_3$ mixture that was used was the mixture L5® marketed by the Merck KGaA company (refractive index n=1.48 at 500 nm).

The deposition frame is a Leybold 1104 machine fitted with an electron gun (ESV14 8 kV) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

The method for making optical articles comprises the step of introducing the substrate, a step of activating the surface of the substrate by means of an argon ion beam (anode current: 1 A, anode voltage: 100 V, neutralization current: 130 mA), turning the ion irradiation off, then forming the various layers of the antireflective coating by successive evaporations and at last a ventilation step.

2. Evaluation of the Global Efficiency of an Antireflection Treatment on an Optical Lens In order to quantify the global efficiency on a wide angular range of an antireflection treatment on an optical lens, the parameter $\alpha$ defined as follows has been used, $\theta$ being the angle of incidence on the lens surface:

$$\alpha = \int_0^{45°} Rv(\theta)\sin(\theta)d\theta$$

This parameter does not take into account angles of incidence higher than 45° for the following reasons. Firstly, on the wearer's point of view, reflections on the rear face no longer reach the eye beyond an angle of incidence of 45°. Secondly, on the observer's point of view, observation of glasses at an angle of incidence higher than 45° corresponds to unusual situations that are not representative.

To simplify the calculation of this parameter, the hypothesis has been made that $R_v$ is almost constant on two intervals:

$$Rv(\theta) \approx Rv(15), \quad 0 \leq \theta \leq 25°$$

$$Rv(\theta) \approx Rv(35), \quad 25° \leq \theta \leq 45°$$

This leads to the following approximate multiangularity parameter, which reveals that angles of incidence ranging from 0° to 25° provide a contribution that is twice lower than angles of incidence ranging from 25° to 45°:

$$\alpha \approx \int_0^{25°} Rv(15)\sin(\theta)d\theta + \int_{25°}^{45°} Rv(35)\sin(\theta)d\theta$$

$$= Rv(15)\int_0^{25°}\sin(\theta)d\theta + Rv(35)\int_{25°}^{45°}\sin(\theta)d\theta$$

$$= Rv(15)[-\cos(\theta)]_0^{25°} + Rv(35)[-\cos(\theta)]_{25°}^{45°}$$

$$= Rv(15)(1 - \cos(25)) + Rv(35)(\cos(25) - \cos(45))$$

$$\approx 0.093 \cdot Rv(15) + 0.199 * Rv(35)$$

After renormalization of the contributions at 15° and 35°, the formula becomes:

$$\alpha \approx a \cdot R_v(15°) + b \cdot R_v(35°)$$

with a=0.318 and b=0.682

Renormalization is a way to set $\alpha$ to 1% when $R_v(15°)$ and $R_v(35°)$ are equal to 1%. The respective values of a and b show the respective amount of light received for low incident angle region and high incident angle region.

And finally, by considering the two main faces of the optical lens, the following parameter formula is obtained:

$\alpha 2 = 0.159 \cdot (R_v^{front}(15°) + R_v^{rear}(35°)) + 0.341 \cdot (R_v^{front}(35°) + R_v^{rear}(35°))$, in which $R_v^{front}(\theta)$ and $R_v^{rear}(\theta)$ respectively represent the mean light reflection factor $R_v(\theta)$ on the front main face and the rear main face of the substrate for an angle of incidence $\theta$.

3. Results

The structures of various antireflection coatings prepared according to the invention and their optical properties are shown in the tables hereunder. The sub-layer is represented in bolded text.

| Example 1 (rear face coating) | |
|---|---|
| Substrate | |
| HC1.5 | |
| $SiO_2$ | 150 nm |
| $ZrO_2$ | 10.1 nm |
| $SiO_2$ | 36.1 nm |
| $ZrO_2$ | 102.9 nm |
| $SiO_2$ | 22.4 nm |
| $SnO_2$ | 6.5 nm |
| $SiO_2$ | 55.4 nm |
| Rv(15°) (%) | 0.50 |
| Rv(35°) (%) | 0.59 |
| Rv(40°) (%) | 0.78 |
| Ruv(35°) (%) | 2.01 |
| Rvmin (%) | 0.47 |
| $\theta_{min}$ | 23° |
| $\alpha$ | 0.56 |
| h (°) | 280 |
| C* (15°) | 20 |

| Example 2 (rear face coating) | |
|---|---|
| Substrate | |
| HC1.6 | |
| $SiO_2$ | 36.1 nm |
| $ZrO_2$ | 5.7 nm |
| $SiO_2$ | 120 nm |
| $ZrO_2$ | 10.3 nm |
| $SiO_2$ | 36 nm |
| $ZrO_2$ | 96.4 nm |

Example 2 (rear face coating)

| Substrate | |
|---|---|
| HC1.6 | |
| SiO$_2$ | 19.4 nm |
| SnO$_2$ | 6.5 nm |
| SiO$_2$ | 61.2 nm |
| Rv(15°) (%) | 0.40 |
| Rv(35°) (%) | 0.49 |
| Rv(40°) (%) | 0.66 |
| Ruv(35°) (%) | 2.01 |
| Rvmin (%) | 0.38 |
| θ$_{min}$ | 23° |
| α | 0.46 |
| h (°) | 280 |
| C* (15°) | 20 |

Example 3 (rear face coating)

| Substrate | |
|---|---|
| HC1.5 | |
| SiO$_2$ | 150 nm |
| ZrO$_2$ | 13.9 nm |
| SiO$_2$ | 29.8 nm |
| ZrO$_2$ | 80.8 nm |
| SnO$_2$ | 6.5 nm |
| SiO$_2$ | 9.8 nm |
| ZrO$_2$ | 14.8 nm |
| SiO$_2$ | 71.6 nm |
| Rv(15°) (%) | 0.70 |
| Rv(35°) (%) | 0.78 |
| Rv(40°) (%) | 0.95 |
| Ruv(35°) (%) | 2.16 |
| Rvmin (%) | 0.68 |
| α | 0.75 |
| θ$_{min}$ | 24° |
| h (°) | 260 |
| C* (15°) | 13 |

Example 4 (rear face coating)

| Substrate | |
|---|---|
| HC1.6 | |
| SiO2 | 32.5 nm |
| ZrO2 | 5.3 nm |
| SiO$_2$ | 143.6 nm |
| ZrO$_2$ | 11.4 nm |
| SiO$_2$ | 27.9 nm |
| ZrO$_2$ | 101.3 nm |
| SiO$_2$ | 21.7 nm |
| SnO$_2$ | 6.5 nm |
| SiO$_2$ | 55.9 nm |
| Rv(15°) (%) | 0.68 |
| Rv(35°) (%) | 0.78 |
| Rv(40°) (%) | 0.90 |
| Ruv(35°) (%) | 2.00 |
| Rvmin (%) | 0.62 |
| α | 0.75 |
| θ$_{min}$ | 23° |
| h (°) | 260 |
| C* (15°) | 13 |

Example 6 (front face coating)

| Substrate | |
|---|---|
| HC1.6 | |
| SiO$_2$ | 36.4 nm |
| ZrO$_2$ | 6.1 nm |
| SiO$_2$ | 164.5 nm |
| ZrO$_2$ | 12.5 nm |
| SiO$_2$ | 31.7 nm |
| ZrO$_2$ | 93.4 nm |
| SnO$_2$ | 6.5 nm |
| SiO$_2$ | 89.3 nm |
| Rv(15°) (%) | 0.40 |
| Rv(35°) (%) | 0.39 |
| Rv(40°) (%) | 0.53 |
| Ruv(35°) (%) | 6.9 |
| Rvmin (%) | 0.34 |
| α | 0.39 |
| θ$_{min}$ | 27° |
| h (°) | 280 |
| C* (15°) | 13 |

Example 5 (front face coating)

| Substrate | |
|---|---|
| HC1.5 | |
| SiO$_2$ | 150 nm |
| ZrO$_2$ | 18.4 nm |
| SiO$_2$ | 22.5 nm |
| ZrO$_2$ | 80.8 nm |
| SnO$_2$ | 6.5 nm |
| SiO$_2$ | 91.4 nm |
| Rv(15°) (%) | 0.50 |
| Rv(35°) (%) | 0.44 |
| Rv(40°) (%) | 0.55 |
| Ruv(35°) (%) | 10.7 |
| Rvmin (%) | 0.40 |
| α | 0.46 |
| θ$_{min}$ | 30° |
| h (°) | 260 |
| C* (15°) | 14 |

Example 8 (front face coating)

| Substrate | |
|---|---|
| HC1.6 | |
| SiO$_2$ | 35.8 nm |
| ZrO$_2$ | 4.4 nm |
| SiO$_2$ | 163.4 nm |
| ZrO$_2$ | 16.2 nm |
| SiO$_2$ | 22.4 nm |
| ZrO$_2$ | 88.3 nm |
| SnO$_2$ | 6.5 nm |
| SiO$_2$ | 88.3 nm |
| Rv(15°) (%) | 0.40 |
| Rv(35°) (%) | 0.36 |
| Rv(40°) (%) | 0.49 |
| Ruv(35°) (%) | 6.0 |
| Rvmin (%) | 0.32 |
| α | 0.37 |
| θ$_{min}$ | 29° |
| h (°) | 260 |
| C* (15°) | 21 |

Example 7 (front face coating)

| Substrate | |
|---|---|
| HC1.5 | |
| SiO₂ | 150 nm |
| ZrO₂ | 15.2 nm |
| SiO₂ | 30.5 nm |
| ZrO₂ | 93.6 nm |
| SnO₂ | 6.5 nm |
| SiO₂ | 92.1 nm |
| Rv(15°) (%) | 0.50 |
| Rv(35°) (%) | 0.42 |
| Rv(40°) (%) | 0.53 |
| Ruv(35°) (%) | 5.5 |
| Rvmin (%) | 0.40 |
| α | 0.44 |
| θ$_{min}$ | 30° |
| h (°) | 280 |
| C* (15°) | 21 |

Example 10 (rear face coating)

| Substrate | |
|---|---|
| HC1.5 | |
| SiO₂ | 150 nm |
| ZrO₂ | 13.6 nm |
| SiO₂ | 31.6 nm |
| ZrO₂ | 101.5 nm |
| SiO₂ | 18.0 nm |
| SnO₂ | 6.5 nm |
| SiO₂ | 62.6 nm |
| Rv(15°) | 0.50 |
| Rv(35°) | 0.63 |
| Rv(40°) | 0.81 |
| Ruv(35°) | 2.0 |
| Rvmin | 0.49 |
| α | 0.58 |
| θ$_{min}$ | 20° |
| h (°) | 275 |
| C* (15°) | 14 |

Example 9 (front face coating)

| Substrate | |
|---|---|
| HC1.5 | |
| SiO₂ | 15 nm |
| ZrO₂ | 21.2 nm |
| SiO₂ | 22.5 nm |
| ZrO₂ | 80.5 nm |
| SnO₂ | 6.5 nm |
| SiO₂ | 92.4 nm |
| Rv(15°) | 0.50 |
| Rv(35°) | 0.47 |
| Rv(40°) | 0.58 |
| Ruv(35°) | 11.7 |
| Rvmin | 0.43 |
| α | 0.48 |
| θ$_{min}$ | 29° |
| h (°) | 260 |
| C* (15°) | 12 |

Example 11 (front face coating)

| Substrate | |
|---|---|
| HC1.6 | |
| SiO₂ | 34.5 nm |
| ZrO₂ | 4.5 nm |

-continued

Example 11 (front face coating)

| Substrate | |
|---|---|
| HC1.6 | |
| SiO₂ | 157.8 nm |
| ZrO₂ | 18.9 nm |
| SiO₂ | 21.5 nm |
| ZrO₂ | 85.3 nm |
| SnO₂ | 6.5 nm |
| SiO₂ | 89.2 nm |
| Rv(15°) | 0.40 |
| Rv(35°) | 0.44 |
| Rv(40°) | 0.58 |
| Ruv(35°) | 8.3 |
| Rvmin | 0.36 |
| α | 0.43 |
| θ$_{min}$ | 26° |
| h (°) | 260 |
| C* (15°) | 11 |

Example 12 (rear face coating)

| Substrate | |
|---|---|
| HC1.6 | |
| SiO₂ | 31.9 nm |
| ZrO₂ | 5.2 nm |
| SiO₂ | 127.1 nm |
| ZrO₂ | 12.3 nm |
| SiO₂ | 31.3 nm |
| ZrO₂ | 96.2 nm |
| SiO₂ | 13.0 nm |
| SnO₂ | 6.5 nm |
| SiO₂ | 68.4 nm |
| Rv(15°) | 0.40 |
| Rv(35°) | 0.53 |
| Rv(40°) | 0.70 |
| Ruv(35°) | 2.0 |
| Rvmin | 0.40 |
| α | 0.48 |
| θ$_{min}$ | 20° |
| h (°) | 275 |
| C* (15°) | 14 |

Example 13 (front face coating)

| Substrate | |
|---|---|
| HC1.5 | |
| ZrO₂ | 22.8 nm |
| SiO₂/Al₂O₃ | 23.9 nm |
| ZrO₂ | 75.4 nm |
| SnO₂ | 6.5 nm |
| SiO₂/Al₂O₃ | 92.9 nm |
| Rv(15°) | 0.51 |
| Rv(35°) | 0.50 |
| Rv(40°) | 0.62 |
| Ruv(35°) | 15 |
| Rvmin | 0.46 |
| α | 0.50 |
| θ$_{min}$ | 30° |
| h (°) | 260 |
| C* (15°) | 12 |

| Example 14 (front face coating) | |
|---|---|
| Substrate | |
| HC1.5 | |
| $SiO_2$ | 150 nm |
| $ZrO_2$ | 19.6 nm |
| $SiO_2$ | 22.1 nm |
| $ZrO_2$ | 83.4 nm |
| $SnO_2$ | 6.5 nm |
| $SiO_2$ | 91.2 nm |
| Rv(15°) | 0.50 |
| Rv(35°) | 0.47 |
| Rv(40°) | 0.59 |
| Ruv(35°) | 10 |
| Rvmin | 0.44 |
| α | 0.48 |
| $\theta_{min}$ | 30° |
| h (°) | 260 |
| C* (15°) | 12 |

The structures of two comparative antireflection coatings for front and rear faces and their optical properties are shown in the table below. These antireflective coatings show usual performances with Rv values well below 1% for low incident angles, but with Rv increasing monotonically with the angle of incidence. In particular, the minimum value of Rv reported for these comparative examples is obtained for a normal angle of incidence: $\theta_{min}=0°$. This feature differs from the invention.

| Comparative example A (front face coating) | |
|---|---|
| Substrate | |
| HC1.5 | |
| $SiO_2$ | 150 nm |
| $ZrO_2$ | 28.3 nm |
| $SiO_2$ | 22.9 nm |
| $ZrO_2$ | 71.9 nm |
| $SnO_2$ | 6.5 nm |
| $SiO_2$ | 84.3 nm |
| Rv(15°) | 0.70 |
| Rv(35°) | 0.97 |
| Rv(40°) | 1.20 |
| Ruv(35°) | 15.7 |
| Rvmin | 0.69 |
| α | 0.88 |
| $\theta_{min}$ | 0° |
| h (°) | 135 |
| C* (15°) | 9 |

| Comparative example B (rear face coating) | |
|---|---|
| Substrate | |
| HC1.5 | |
| $SiO_2$ | 150 nm |
| $ZrO_2$ | 18.4 nm |
| $SiO_2$ | 23.0 nm |
| $ZrO_2$ | 100.6 nm |
| $SnO_2$ | 6.5 nm |
| $SiO_2$ | 75.6 nm |
| Rv(15°) | 0.78 |
| Rv(35°) | 1.06 |
| Rv(40°) | 1.28 |
| Ruv(35°) | 2.00 |
| Rvmin | 0.76 |
| α | 0.97 |
| $\theta_{min}$ | 0° |
| h (°) | 135 |
| C* (15°) | 9 |

The antireflection coatings according to the invention have a $R_{vmin}$ that is lower than) $R_v(15°$ by at least 5% and strongly reduce reflection of visible rays on both main faces of the optical lens.

For rear face coatings (Ex. 1 to 4, 10, 12) reduction of reflection of harmful UV light on the rear main face is significant, as Ruv(35°) is lower than 3%.

For front face coatings (Ex. 5 to 9, 11, 13 and 14), $R_{vmin}$ is lower than $R_v(15°)$ by at least 10%, even 20% for Ex. 5, 7 and 8. As a result, global reflection coefficient α is smaller for inventive examples as compared to comparative example A, and reaches values lower than 0.6, sometimes lower than 0.5 and even lower than 0.4 for Ex. 6 and 8.

As a matter of fact, coatings of examples 5 and 7, deposited on substrates having a refractive index of 1.5, reflect almost half the light that is reflected by comparative coating A (see FIG. 1), when a wide range of angles of incidence is considered: a about 0.45 as compared to α=0.88.

Figure 2:
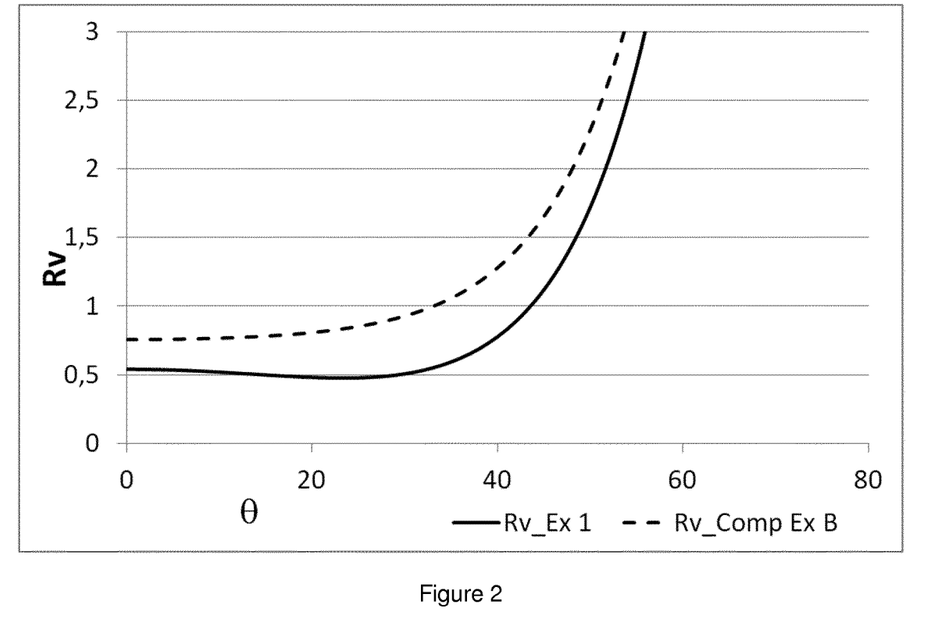
FIG. 2: the plotting of the mean light reflection factor $R_v$ (in %) as a function of the angle of incidence θ (in degrees) for optical lenses according to the invention (solid line) and comparative lenses (dotted line), respectively on the rear main face.

The same result is observed for the coatings of examples 1 and 3, deposited on a substrate having a refractive index of 1.5 as compared to comparative coating B (see FIG. 2).

Figure 1:
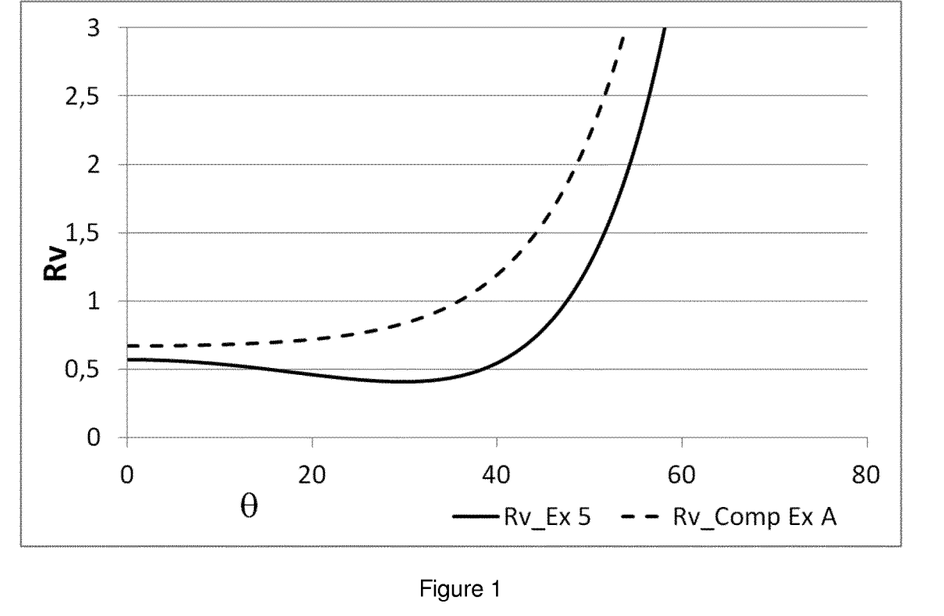
FIG. 1: the plotting of the mean light reflection factor $R_v$ (in %) as a function of the angle of incidence θ (in degrees) for optical lenses according to the invention (solid line) and comparative lenses (dotted line), respectively on the front main face.

As shown by FIGS. 1 and 2, optical lenses according to the invention have a $R_v(0)$ decreased by 30-55%, depending on the angle of incidence θ and the main face that is considered, as compared to the comparative lens. The improvement is around 30-35% for an angle of incidence of 15° and 45-55% for an angle of incidence of 35°. The mean light reflection factor $R_v(\theta)$ presents a minimum value $R_{vmin}$ for angles of incidence $\theta_{min}$ ranging from 23° to 30°.

The optical lenses according to the invention had no cosmetic defects, a neutral tint in transmission, high abrasion resistance, adhesion and thermal stability, reduced mirror effect perception on the front main face and reduced reflection perception on the rear main face.

Lenses L1 to L3 made of ORMA® substrate (refractive index 1.5, available from ESSILOR) were prepared with the following coating configurations and evaluated by a trained panel for reflection on front side (observer's point, of view) and rear side (wearer's point of view). Scale is from 0 (very reflecting) to 10 (not reflecting at all). Perceptible difference is estimated at 5%. A comparative lens made of ORMA® substrate available from ESSILOR and coated with comparative examples A and B coatings has been included in this test.

| | Front face coating | Rear face coating | α2 | Front side evaluation | Rear side evaluation |
|---|---|---|---|---|---|
| Lens L1 | Ex. 5 | Ex. 3 | 0.61 | 4.9 | 4.9 |
| Lens L2 | Ex. 5 | Ex. 1 | 0.51 | 5.9 | 5.4 |
| Lens L3 | Ex. 7 | Ex. 1 | 0.50 | 4.7 | 5.3 |
| Comparative Lens | Comp. Ex A | Comp. Ex B | 0.93 | 3.4 | 3.6 |

This evaluation demonstrates that lenses according to the invention show significantly less reflection than lenses already available and provide enhanced comfort for wearer.

Another advantage of the present optical lenses is their attractive appearance in reflection, whatever the angle of incidence at which the coated substrate is observed. The perceived residual reflected color (hue angle) in reflection when the angle of incidence varies from 0° to 45° is almost the same for an observer having a normal vision.

The invention claimed is:

1. An optical lens comprising a substrate with a front main face and a rear main face, at least one of the main faces being coated with an antireflection coating, which imparts the following properties to said coated main face:
    in a range 0°-50° of angles of incidence θ, a mean light reflection factor $R_v(\theta)$ on said coated main face presents a minimum value $R_{vmin}(\theta_{min})$ for an angle of incidence $\theta_{min}$ comprised in a range 20°-50°, $R_v(\theta)$ and $R_{vmin}(\theta_{min})$ each being a weighted spectral reflection average over the whole visible spectrum between 380 and 780 nm, as defined in the ISO standard 13666: 1998;
    $R_{vmin}(\theta_{min})/R_v(15°)<0.95$, $R_v(15°)$ being the mean light reflection factor for an angle of incidence θ of 15° on said coated main face, $R_{vmin}(\theta_{min})$ being the mean light reflection factor for the angle of incidence $\theta_{min}$ on said coated main face; and
    the antireflection coating imparts a mean light reflection factor $R_v(15°)$ less than or equal to 2.5%.

2. The optical lens of claim 1, wherein $R_{vmin}\theta_{min}/R_v(15°)<0.9$.

3. The optical lens of claim 2, wherein $R_{vmin}\theta_{min}/R_v(15°)<0.8$.

4. The optical lens of claim 1, wherein $R_v(15°)$ is lower than or equal to 1.5% on said coated main face.

5. The optical lens of claim 4, wherein $R_v(15°)$ is lower than or equal to 1% on said coated main face.

6. The optical lens of claim 4, wherein $R_v(15°)$ is lower than or equal to 0.75% on said coated main face.

7. The optical lens of claim 1, wherein $R_v(35°)$ is lower than or equal to 1.5% on said coated main face.

8. The optical lens of claim 7, wherein $R_v(35°)$ is lower than or equal to 1% on said coated main face.

9. The optical lens of claim 7, wherein $R_v(35°)$ is lower than or equal to 0.6% on said coated main face.

10. The optical lens of claim 1, wherein $R_v(\theta)$ is lower than or equal to 1.5% on said coated main face, for each angle of incidence θ ranging from 0° to 45°.

11. The optical lens of claim 10, wherein $R_v(\theta)$ is lower than or equal to 1% on said coated main face, for each angle of incidence θ ranging from 0° to 45°.

12. The optical lens of claim 1, wherein $R_v(\theta)$ is lower than or equal to 0.6%, for each angle of incidence θ ranging from 0° to 40°, on said coated main face.

13. The optical lens of claim 1, wherein in the range 0°-50° of angles of incidence θ, the mean light reflection factor $R_v(\theta)$ on said coated main face presents a minimum value $R_{vmin}\theta_{min}$ for an angle of incidence $\theta_{min}$ comprised in a range 20°-35°.

14. The optical lens of claim 1, wherein said antireflection coating displays a residual color with a hue angle h as defined in the international colorimetric system CIE L*a*b* ranging from 240° to 300°, for an angle of incidence of 15°.

15. The optical lens of claim 1, wherein the front main face and the rear main face of the substrate are both coated with antireflection coatings, identical or different, having the $R_{vmin}\theta_{min}$ and $R_{vmin}\theta_{min}/R_v(15°)$ properties as claimed in claim 1.

16. The optical lens of claim 15, wherein:

$$0.159(R_v^{front}(15°)+R_v^{rear}(15°))+0.341(R_v^{front}(35°)\ R_v^{rear}(35°))\leq 0.7$$

in which $R_v^{front}(\theta)$ and $R_v^{rear}(\theta)$ respectively represent the mean light reflection factor $R_v(\theta)$ on the front main face and the rear main face of the substrate for an angle of incidence θ.

17. The optical lens of claim 1, wherein said at least one main face coated with said antireflection coating is the rear face, and wherein the mean reflection factor $R_{UV}$ on the rear face between 280 nm and 380 nm, weighted by the function $W(\lambda)$ defined in the ISO 13666:1998 standard, is lower than 5%, for an angle of incidence of 35°.

18. The optical lens of claim 1, further defined as an ophthalmic lens.

* * * * *

UNITED STATES PATENT AND TRADEMARK OFFICE
CERTIFICATE OF CORRECTION

PATENT NO. : 11,573,431 B1
APPLICATION NO. : 16/337628
DATED : February 7, 2023
INVENTOR(S) : Francisco De Ayguavives and Hélène Maury Page 1 of 1

It is certified that error appears in the above-identified patent and that said Letters Patent is hereby corrected as shown below:

In the Claims

Claim 1, Column 23, Line 23:
Delete "$R_v(15°$ being" and replace with -- $R_v(15°)$ being --.

Claim 1, Column 23, Line 29:
Delete "factor $R_v(15°$ less" and replace with -- factor $R_v(15°)$ less --.

Signed and Sealed this
Eighteenth Day of April, 2023

Katherine Kelly Vidal
*Director of the United States Patent and Trademark Office*